United States Patent
Dion et al.

(10) Patent No.: US 9,175,725 B2
(45) Date of Patent: Nov. 3, 2015

(54) ROCKING JOURNAL BEARINGS FOR TWO-STROKE CYCLE ENGINES

(71) Applicant: Achates Power, Inc., San Diego, CA (US)

(72) Inventors: Eric P. Dion, Encinitas, CA (US); Clark A. Klyza, San Diego, CA (US); Ryan G. MacKenzie, San Diego, CA (US); Michael H. Wahl, Bonita, CA (US)

(73) Assignee: ACHATES POWER, INC., San Diego, CA (US)

( * ) Notice: Subject to any disclaimer, the term of this patent is extended or adjusted under 35 U.S.C. 154(b) by 71 days.

(21) Appl. No.: 13/776,656

(22) Filed: Feb. 25, 2013

(65) Prior Publication Data

US 2014/0238360 A1    Aug. 28, 2014

(51) Int. Cl.

| | |
|---|---|
| *F16J 1/14* | (2006.01) |
| *F16C 33/04* | (2006.01) |
| *F16J 1/09* | (2006.01) |
| *F16J 1/16* | (2006.01) |
| *F02B 75/28* | (2006.01) |
| *F01M 11/02* | (2006.01) |

(52) U.S. Cl.
CPC . *F16C 33/04* (2013.01); *F16J 1/09* (2013.01); *F16J 1/14* (2013.01); *F16J 1/16* (2013.01); *F01M 2011/026* (2013.01); *F02B 75/28* (2013.01)

(58) Field of Classification Search
CPC .......... F02B 75/32; F02B 75/28; F02B 75/26; F01L 2810/02; F01B 9/02; F01B 3/0005; F16C 9/04; F16C 33/10; F16C 33/1065; F01M 1/06; F16J 1/14
USPC ................ 123/197.1, 51 AA, 51 BA; 92/157; 384/129, 154–155, 266, 275, 288–289, 384/429–430
See application file for complete search history.

(56) References Cited

U.S. PATENT DOCUMENTS

| | | | | | |
|---|---|---|---|---|---|
| 1,680,017 | A | * | 8/1928 | Fornaca | 123/51 BA |
| 1,899,355 | A | * | 2/1933 | Reid | 403/230 |
| 2,236,401 | A | * | 3/1941 | Gehres | 123/41.38 |

(Continued)

FOREIGN PATENT DOCUMENTS

| | | |
|---|---|---|
| JP | 56-132414 | 10/1981 |
| JP | 58-109537 | 7/1983 |

(Continued)

OTHER PUBLICATIONS

Wakuri et al, "On the Lubrication of Crosshead-pin Bearing with Eccentric Journal" Bulletin of the JSME, vol. 25, No. 206, Aug. 1982, Paper No. 206-17, pp. 1312-1320.*

(Continued)

*Primary Examiner* — Lindsay Low
*Assistant Examiner* — Kevin Lathers
(74) *Attorney, Agent, or Firm* — Terrance A. Meador (57) ABSTRACT

A rocking journal bearing for a two-stroke cycle engine includes a bearing sleeve having a bearing surface with a plurality of axially-spaced, eccentrically-disposed surface segments and a rocking journal having a plurality of axially-spaced, eccentrically-disposed journal segments. The rocking journal is retained for rocking oscillation on the bearing surface. Space for receiving oil is provided in the rocking journal and oil delivery outlets acting through the journal segments deliver received oil to the bearing surfaces.

10 Claims, 11 Drawing Sheets

(56) References Cited

U.S. PATENT DOCUMENTS

| | | | |
|---|---|---|---|
| 2,625,448 A * | 1/1953 | Underwood | 384/291 |
| 2,757,990 A | 8/1956 | Barlow | |
| 3,380,789 A * | 4/1968 | Nigh | 384/155 |
| 3,495,685 A | 2/1970 | Rinsum | |
| 3,762,389 A | 10/1973 | Malina | |
| 6,120,189 A | 9/2000 | Beagle et al. | |
| 2009/0145394 A1 | 6/2009 | Nigro et al. | |
| 2012/0073526 A1 | 3/2012 | Dion et al. | |
| 2012/0073538 A1 | 3/2012 | Hofbauer | |

FOREIGN PATENT DOCUMENTS

| | | |
|---|---|---|
| JP | 2000-054816 | 2/2000 |
| WO | WO 2014/130969 A1 | 8/2014 |

OTHER PUBLICATIONS

Sammons, H. et al., "Napier Nomad Aircraft diesel Engine", SAE Transactions, vol. 63, Jun. 10, 1954, pp. 107-131.

Wakuri, Y., et al., "On the Lubrication of Crosshead-pin Bearing with Eccentric Journal" Bulletin of the JSME, vol. 25, No. 206, Aug. 1982, Paper No. 206-17, pp. 1312-1320.

Booker, J. F., et al., "Dynamic Analysis of Rocking Journal Bearings With Multiple Offset Segments", Transactions of the ASME, vol. 104, Oct. 1982, pp. 478-490.

International Search Report and Written Opinion, PCT/US2014/018108, mailed Jul. 10, 2014.

Glacier-Clevite Inter-Office Memorandum re "Rocking Pin Bushing Design", Feb. 17, 1992.

Fairbanks Morse Meeting Notes re "Meeting between Glacier-Clevite and Fairbanks Morse", Jun. 5, 1992.

* cited by examiner

ROCKING JOURNAL BEARINGS FOR TWO-STROKE CYCLE ENGINES

RELATED APPLICATIONS

This application contains subject matter related to the subject matter of commonly-owned U.S. patent application Ser. No. 13/136,955, filed Aug. 15, 2011 and published as US 2012/0073526 A1 on Mar. 29, 2012.

BACKGROUND

The field relates to two-stroke cycle engines, particularly to nonreversing loading of journal bearings in the piston/crankshaft linkages of two-stroke opposed-piston engines.

In the 4-stroke cycle of a conventional crank-rod-slider engine, the inertial force of a piston assembly imparts a negative (i.e. opposite direction) load on a wristpin bearing during the exhaust stroke. During this load reversal period the load bearing surfaces in the wristpin separate and lubricating oil enters into the small gap between the pin and the bearing surface. This oil supply is critical for the bearing to operate in a full hydrodynamic mode, due to squeeze film generation and/or relative motion between the components.

In some aspects of two-stroke cycle engine operation, due to the nature of the cycle, a load reversal on journal bearings may never occur during the normal speed and load range operation of the engine; or, the duration of a load reversal might be relatively short. For example, during operation of a two-cycle diesel engine, a combustion event occurs every cycle and there is nearly always a gas pressure loading on the crown of a piston near top center (TC), which, even at high piston speeds, is still greater than the inertial force of the piston assembly on a crosshead bearing in the piston/crankshaft linkage. At the other end of the cycle, at bottom center (BC) the inertial force of the piston assembly keeps the crosshead bearing loaded as well. As a result, the bearing is nearly always under positive load throughout the cycle. Hence it is difficult to replenish the crosshead bearing with oil. Furthermore, given limited angular oscillation of the bearing, oil introduced between the bearing surfaces does not completely fill the bearing. Eventually the bearing begins to operate in a boundary layer lubrication mode (also called "boundary lubrication mode"), which leads to excess friction, wear, and then bearing failure.

In two-stroke cycle engine construction, nonreversing loading of journal bearings has been addressed in several ways, for example by use of 1.) rolling element bearings, 2.) high pressure lubrication to separate the bearing surfaces and force oil into the joint, 3.) sectored bearings to entrain oil flow in between the surfaces, 4.) reduction of engine load to allow for reduced bearing pressures, or 5.) combinations of some or all of the above items. These measures can address the need for adequate lubrication in engines of moderate load and durability requirements but they are of limited effect for a highly loaded, long life (10,000+ hour) two-stroke cycle engine.

Figure 1:
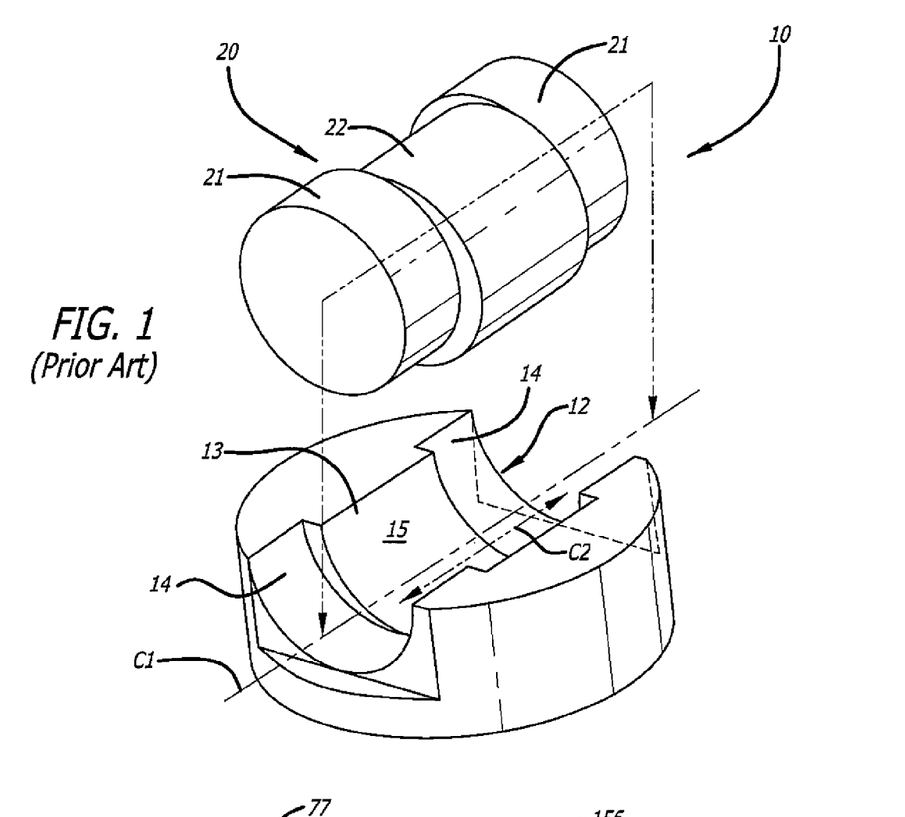
FIG. 1 is a schematic illustration showing elements of a prior art rocking journal bearing.

A rocking journal bearing construction as shown in FIG. 1 has been proposed for reducing the nonreversing load problem in journal bearings of two-stroke cycle engines. In the figure, the bearing elements are shown separated with relative dimensions exaggerated in order to more clearly present offsets between segments of the bearing. As per FIG. 1, a rocking journal bearing 10 with multiple offset segments includes a segmented bearing sleeve 12 and a correspondingly-segmented bearing journal 20. The sleeve 12 includes a bearing surface 13 with a plurality of axially-spaced, eccentrically-disposed surface segments, and the journal includes a plurality of axially-spaced, eccentrically-disposed journal segments. The sleeve 12 has a semi-cylindrical configuration with two lateral surface segments 14 sharing a first centerline C1 and a central surface segment 15 separating the two lateral surface segments 14 and having a second centerline C2 offset from the first centerline. The journal 20 has a cylindrical configuration with two lateral journal segments 21 positioned to share the first centerline C1 and a central journal segment separating the two lateral journal segments and positioned to share the second centerline C2. The journal segments are lifted from the surface of the sleeve periodically during a rocking portion of the cycle, thus relieving the load on one or more segments while maintaining the total load on the remaining segments. Separation of the sleeve and journal segments provides clearance for the entry of oil into the joint.

Although journal rocking provides separation allowing introduction of oil between the bearing surfaces, limited angular oscillation of the bearing impairs the formation of a continuous film of oil that fills the volume between the bearing interfaces. During the portion of the bearing cycle when the various journal segments lift, a low pressure region is created on the mating contact region of the sleeve leading to potential voids in the surface film and potential cavitation if not filled adequately. Oil filling thus plays a substantial role in the operation and durability of a rocking journal bearing.

In the prior art, the circumferential borders between adjoining surface and journal segments are grooved to provide for transport of oil around circumferential peripheries of the segments. In certain heavy duty two-stroke cycle engines, axial grooves provided in the surface segments intersect circumferential grooves between the surface segments in order to increase the penetration of oil into the interfaces between surface and journal segments. However, in these bearing constructions, oil is provided via inertia-operated channels that feed into the circumferential grooves of the surface segments, which limits the pressure at which the oil is provided to the bearing interfaces. Moreover, the pressure of the inertia-fed oil fluctuates during engine operation. Consequently, the oil may be fed to the bearing interfaces at pressure levels that are insufficient to maintain continuous oil films of adequate thickness to avoid boundary-layer lubrication, which can result in limited durability and shortened lifetime of these rocking journal bearing constructions.

Adequate penetration of oil into the rocking journal interfaces requires that a continuously-available supply of pressurized oil be timely delivered to a rocking journal bearing for application to the bearing interfaces during a filling cycle.

SUMMARY

An objective is to provide a rocking journal bearing arrangement constructed to supply pressurized oil for application to the bearing interfaces during operation of a two-stroke cycle engine. A rocking journal bearing includes a bearing surface with a plurality of axially-spaced, eccentrically-disposed surface segments and a rocking journal including a plurality of axially-spaced, eccentrically-disposed journal segments. The rocking journal is retained for rocking oscillation on the bearing surface. An oil space is provided in the rocking journal to receive and maintain a volume of pressurized oil. The rocking journal bearing includes an inlet passage for delivering oil to the oil space and outlet passages that act through the journal segments to provide oil to fill the journal interfaces.

The stream of pressurized oil enables the oil space to provide a steady supply of oil at pressures exceeding those of gravity-fed channels and also dampens or eliminates fluctuations in the oil pressure.

DETAILED DESCRIPTION OF PREFERRED EMBODIMENTS

A two-stroke cycle engine is an internal combustion engine that completes a power cycle with a single complete rotation of a crankshaft and two strokes of a piston connected to the crankshaft. One example of a two-stroke cycle engine is an opposed-piston engine in which a pair of pistons is disposed in opposition in the bore of a cylinder. Although this is a preferred embodiment of a two-stroke cycle engine in which nonreversing loads afflict wristpin and other journal bearings, the rocking journal bearing constructions to be described can be utilized with other types of two-stroke cycle engines.

Figure 2:
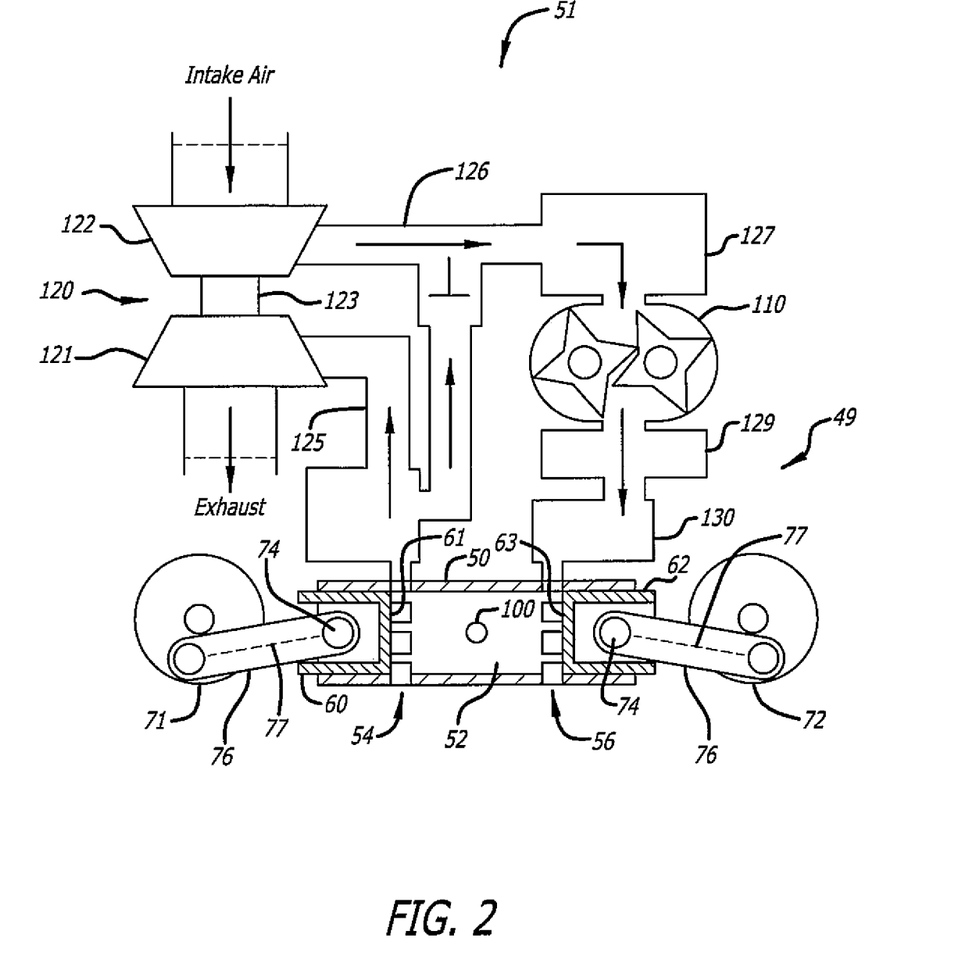
FIG. 2 is a longitudinal cross-sectional view taken through a cylinder of a two-stroke cycle engine with wrist pin arrangements constructed with rocking journal bearings.

As seen in FIG. 2, an opposed-piston engine 49 has at least one ported cylinder 50. For example, the engine may have one ported cylinder, two ported cylinders, three ported cylinders, or four or more ported cylinders. For purposes of illustration, the engine 49 is presumed to have a plurality of ported cylinders. In this regard, each cylinder 50 has a bore 52: exhaust and intake ports 54 and 56 are formed in respective ends thereof. The exhaust and intake ports 54 and 56 each include one or more circumferential arrays of openings. Exhaust and intake pistons 60 and 62 are slidably disposed in the bore 52 with their end surfaces 61 and 63 opposing one another. The exhaust pistons 60 are coupled to a crankshaft 71, and the intake pistons are coupled to a crankshaft 72. Each of the pistons is coupled to its associated crankshaft by a wrist pin 74 and a connecting rod 76. When the pistons 60 and 62 of a cylinder 50 are at or near respective TC locations, a combustion chamber is defined in the bore 52 between the end surfaces 61 and 63 of the pistons. Fuel is injected directly into the combustion chamber through at least one fuel injector nozzle 100 positioned in an opening through the sidewall of the cylinder 50.

The engine 49 is equipped with an air management system 51 that includes a supercharger 110 and a turbocharger 120. The turbocharger has a turbine 121 and a compressor 122 rotating on a common shaft 123. The turbine 121 is coupled to the exhaust subsystem and the compressor 122 is coupled to the charge air subsystem. Exhaust gas emptied into the conduit 125 from the exhaust port 54 rotate the turbine 121. This rotates the compressor 122, causing it to generate charge air by compressing intake air. The charge air output by the compressor 122 flows through a conduit 126, whence it is pumped by the supercharger 110 to the openings of the intake port 56.

The operational cycle of an opposed-piston engine with one or more cylinders such as the cylinder 50 is well understood. In response to combustion occurring between the end surfaces 61, 63 the opposed pistons 60, 62 move away from their TC locations in the cylinder. While moving from TC, the pistons keep their associated ports closed until they approach respective BC positions. The pistons may move in phase so that the exhaust and intake ports 54, 56 open and close in unison; alternatively, one piston may lead the other in phase, in which case the intake and exhaust ports have different opening and closing times. As the pistons move through their BC locations exhaust products flowing out of the exhaust port 54 are replaced by charge air flowing into the cylinder through the intake port 56. After reaching BC, the pistons reverse direction and the ports are again closed by the pistons. While the pistons continue moving toward TC, the charge air in the cylinder 50 is compressed between the end surfaces 61 and 63. As the pistons advance to their respective TC locations in the cylinder bore, fuel is injected through the nozzles 100 into the charge air, and the mixture of charge air and fuel is compressed between the pistons 60 and 62. When the mixture reaches an ignition temperature, the fuel ignites, driving the pistons apart, toward their respective BC locations.

With reference to FIG. 2, each piston includes a wrist pin 74 constructed as a journal bearing. During the operational cycles of the opposed-piston engine, the wrist pins 74 are subjected to nonreversing loads and undergo limited angular oscillations. In order to provide separation of journal surfaces while the engine is operating, the wrist pin constructions are equipped with rocking journal bearings. Although this is a preferred application of a rocking journal bearing, the constructions to be described can be utilized with other types of journal bearings subjected to unidirectional loading throughout the operational cycles of two-stroke cycle engines.

Figure 3:
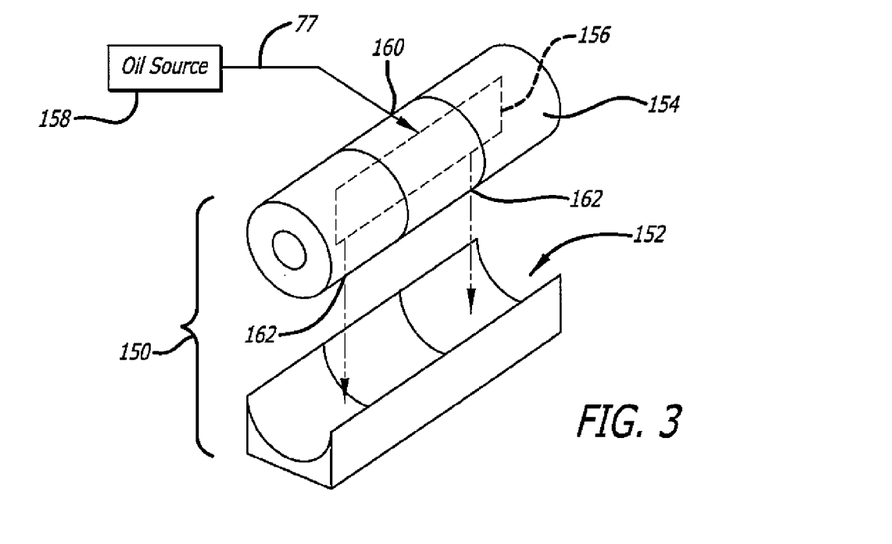
FIG. 3 is a conceptual schematic drawing illustrating a rocking journal bearing with an oil accumulator.

FIG. 3 shows how the rocking bearings are constructed to assure provisioning and distribution of oil at pressures adequate to lubricate the rocking bearing interfaces with a continuous oil film thick and widespread enough to support heavy loading and enhance the durability of the bearing. As per FIG. 3, a rocker journal bearing 150 includes a segmented surface 152 and a correspondingly-segmented journal 154. The construction of the journal 154 includes a space or cavity which receives and distributes oil for lubricating the bearing interfaces. In one aspect, the space or cavity is constituted of an oil accumulator 156 that is fed pressurized oil from a pumped oil source 158. The journal 154 includes at least one inlet into, and multiple outlets from, the accumulator 156. In some aspects, the accumulator 156 receives pressurized oil through an inlet opening 160. Preferably, the inlet opening 160 opens through a portion of the journal surface 152 that is out of contact with the bearing surface during oscillation of the journal 154. In some aspects, seen in FIG. 2, the pressurized oil is delivered via a high-pressure oil passage 77 in the connecting rod 76. Pressurized oil is provided to the rocking journal interfaces by the accumulator 156 through one or more outlets 162 that act through a portion of the journal surface in contact with the bearing surface during oscillation of the bearing. In some aspects, the accumulator 156 has an outlet for each interface as well as an inlet for a lubricant supply. An influx of pressurized oil into the accumulator 156 provides a continuous supply of oil to the bearing during operation of the engine.

Figure 4:
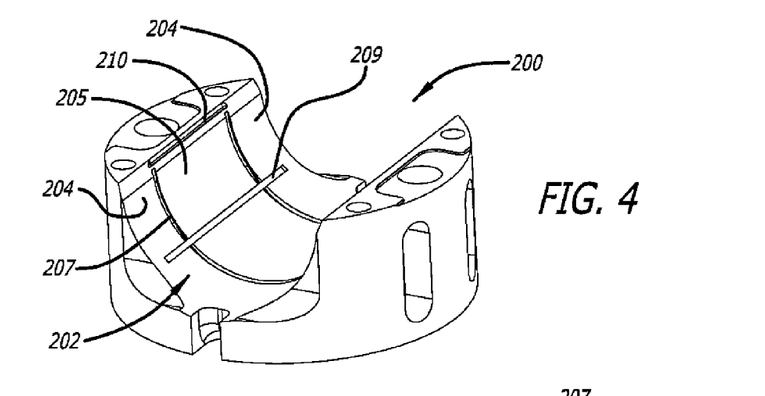
FIGS. 4 and 5 are perspective and plan views, respectively, of a bearing surface element of a first rocking journal bearing construction.
Figures 5, 6:
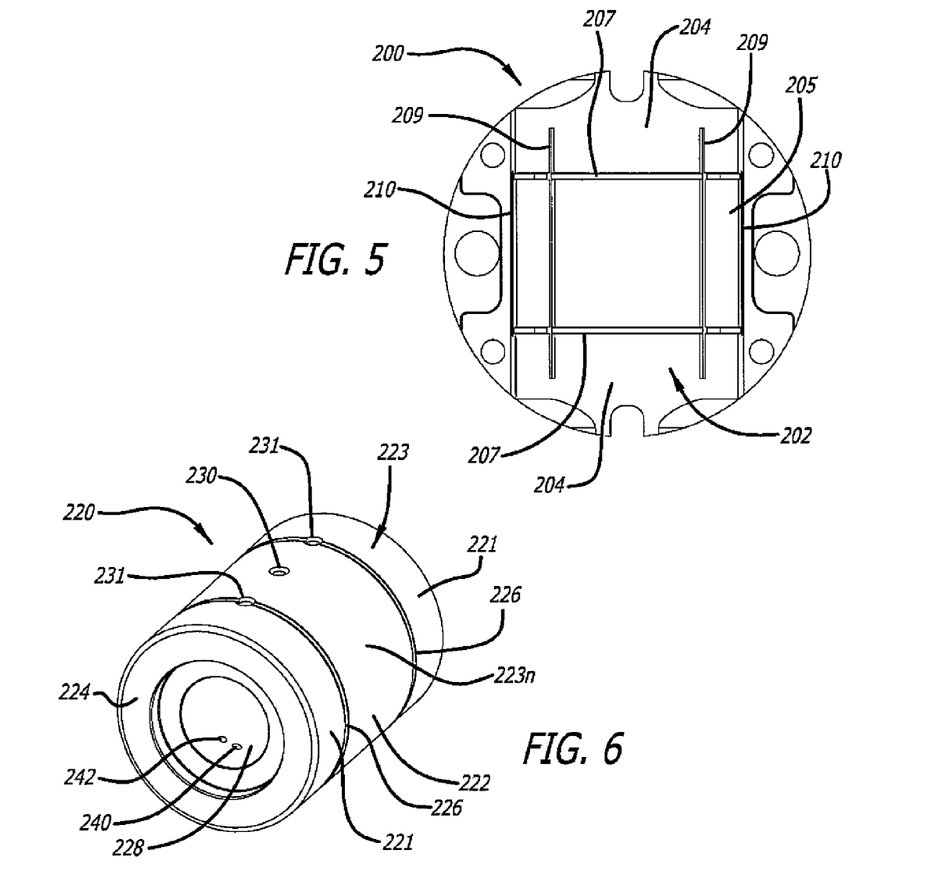
FIGS. 6 and 7 are perspective and longitudinal views, respectively, of a rocking journal element of the first rocking journal bearing construction.

With reference to FIGS. 4 and 6 a preferred rocking journal bearing embodiment includes a bearing sleeve element 200 including a bearing surface 202 with a plurality of axially-spaced, eccentrically-disposed surface segments and a rocking journal 220 including a plurality of axially-spaced, eccentrically-disposed journal segments. Preferably, the bearing surface 202 has a semi-cylindrical configuration with two lateral surface segments 204 sharing a first centerline and a central surface segment 205 separating the two lateral surface segments 204 and having a second centerline offset from the first centerline. As per FIGS. 4 and 5 circumferential oiling grooves 207 are formed in the bearing surface at the borders between the central surface segment 205 and the lateral surface segments 204. In some instances, one or more circumferentially-spaced axial oiling grooves 209 are formed in the bearing surface. Each axial oiling groove 209 runs across the central surface segment 205 and extends at least partially into each of the lateral surface segments 204. In some other instances, oiling grooves 210 are formed along opposing peripheries of the bearing surface 202. A matrix of oiling grooves can be formed in the bearing surface 202 in which the circumferential oiling grooves 207 are intersected by either or both of the axial and peripheral oiling grooves 209, 210.

Figure 7:
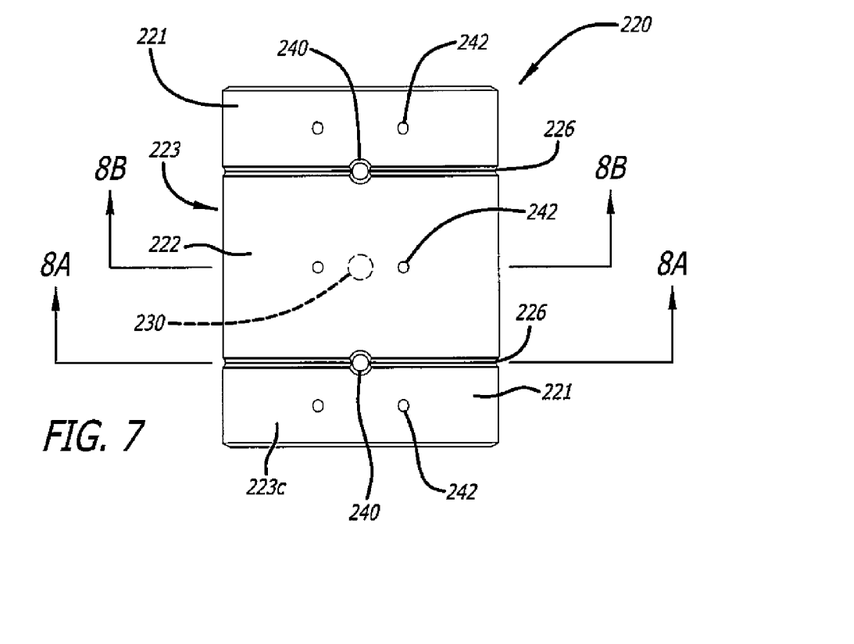
Figure 8A:
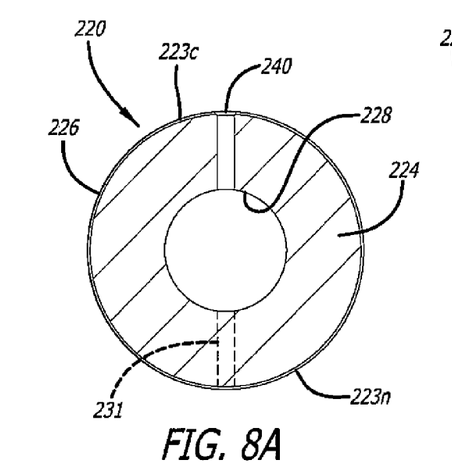
FIGS. 8A and 8B are vertical cross-sectional views of the journal of FIGS. 6 and 7 taken along view lines 8A-8A and 8B-8B, respectively, of FIG. 7.
Figure 8B:
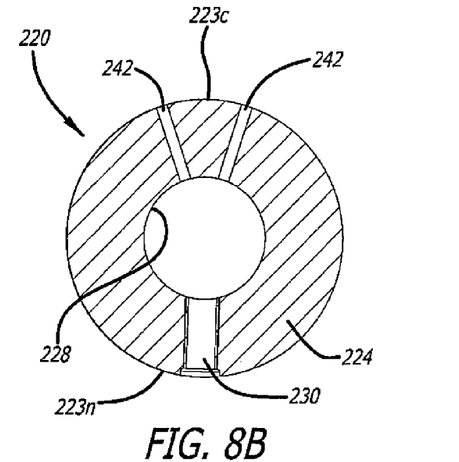

With reference to FIG. 6, the rocking journal 220 has a cylindrical configuration with two lateral journal segments 221 positioned to share the first centerline and a central journal segment 222 separating the two lateral journal segments and positioned to share the second centerline. The rocking journal 220 is a hollow cylindrical piece with an outer surface 223, a sidewall 224 with a thickness, a stepped internal diameter at each end, and a cylindrical inner surface 228. FIGS. 6 and 7 show circumferential oiling grooves 226 formed in the outer surface 223 at the borders between the central journal segment 222 and the lateral journal segments 221. FIGS. 6, 8A and 8B show a non-contacting portion 223n of the outer surface 223 of the rocking journal that is out of contact with the bearing surface 202 during oscillation of the bearing. An inlet passage 230 for pressurized oil is formed through the sidewall 224 in a radial direction of the central journal segment 222; the inlet passage 230 opens through the non-contacting outer surface portion. Threaded retaining holes 231 are formed through the non-contacting portion 223n of the surface 223 on either side of the oil inlet passage 230. FIGS. 7, 8A, and 8B show a contacting portion 223c of the rocking journal outer surface 223 that is in contact with the bearing surface 202 during oscillation of the bearing. First outlet passages 240 for pressurized oil formed in the contacting surface portion 223c of the journal 220 extend through the sidewall 224 in the circumferential grooves 226 in a radial direction of the central journal segment 222 and open through the inside surface 228. As best seen in FIGS. 7 and 8B, the oil inlet and first outlet passages 230 and 240 are axially spaced, in diametrical opposition. In some aspects, second outlet passages 242 are formed through the sidewall 224, outside of the circumferential grooves 226, and open through the inside surface 228. In some aspects, the second outlet passages 242 are arranged in an axial array such that there is at least one second outlet passage located in each journal segment. Preferably, but not necessarily, there are at least two circumferentially spaced axial arrays of second outlet passages 242. Other rocking journal bearing constructions can include only circumferential oiling grooves 207 in the bearing surface 202, with or without axial oiling grooves 209, or only circumferential grooves 226 in the outer surface of the rocking journal 220, with or without axial oiling grooves in the bearing surface.

Figure 9:
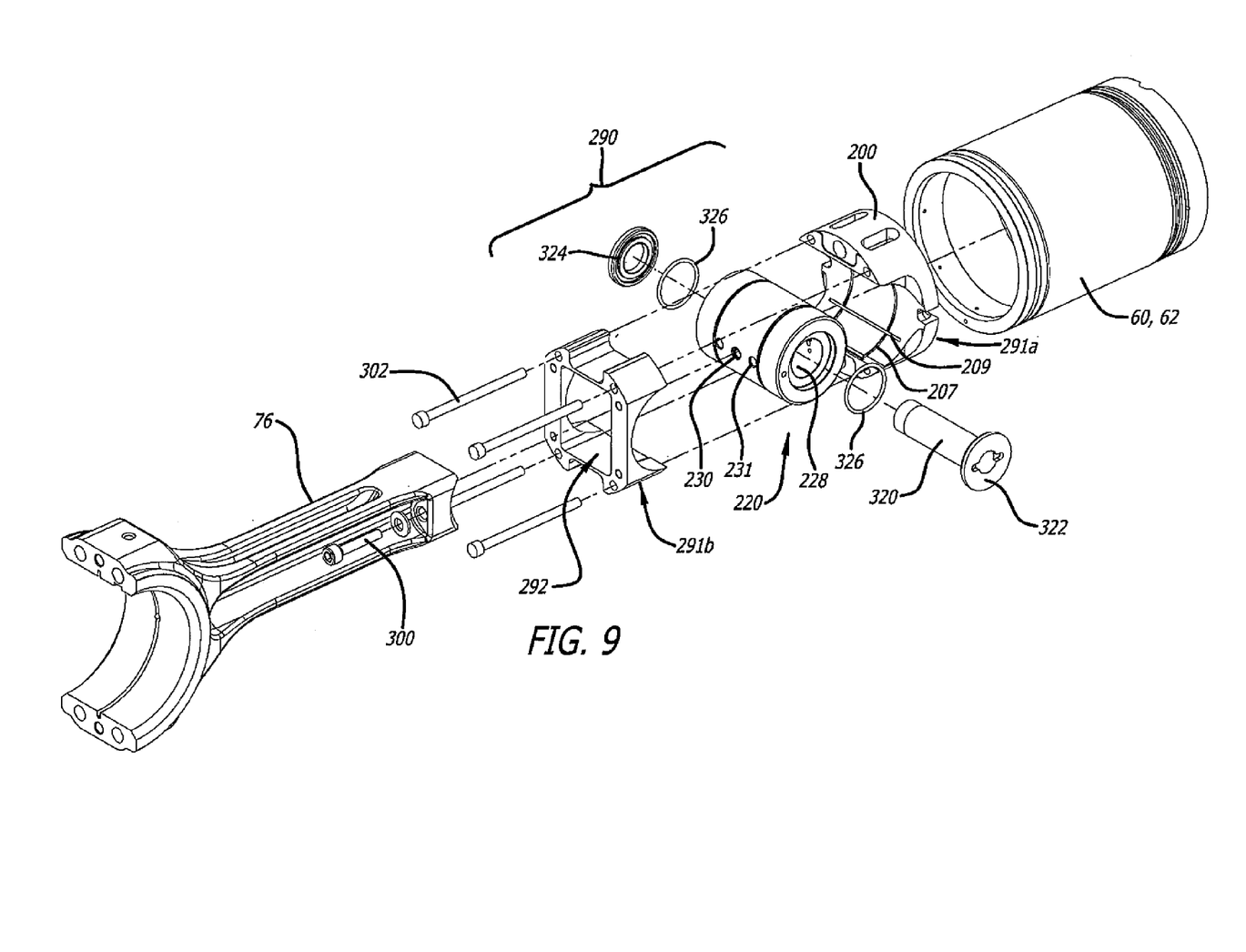
FIG. 9 is an exploded perspective view of a piston linkage assembly embodiment including the a rocking journal bearing arrangement with the bearing surface and journal elements of FIGS. 4 and 6.
Figure 10:
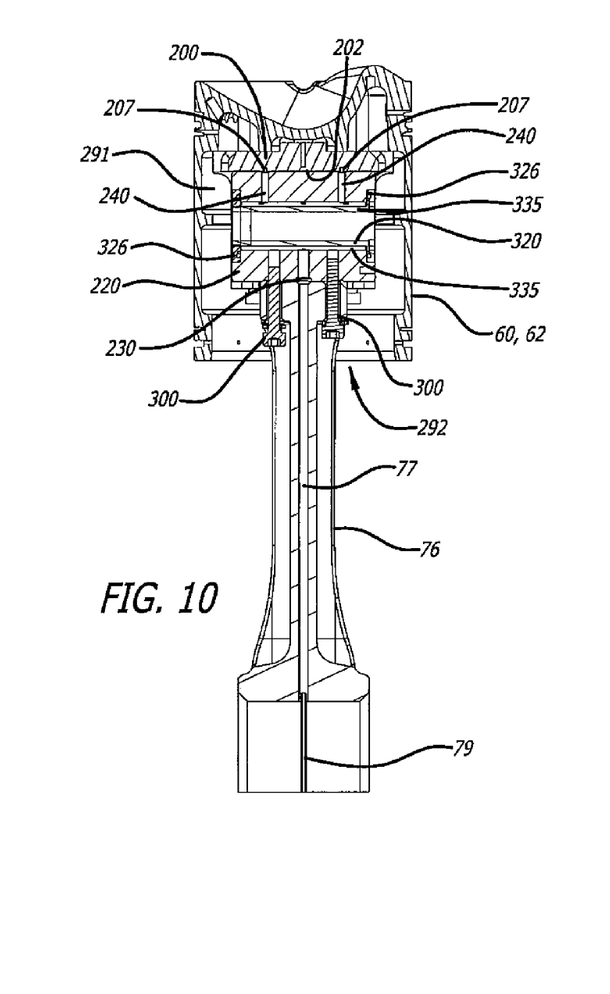
FIGS. 10 and 11 show the assembled piston linkage assembly of FIG. 9 in axially rotated vertical cross-sectional views.
Figure 11:
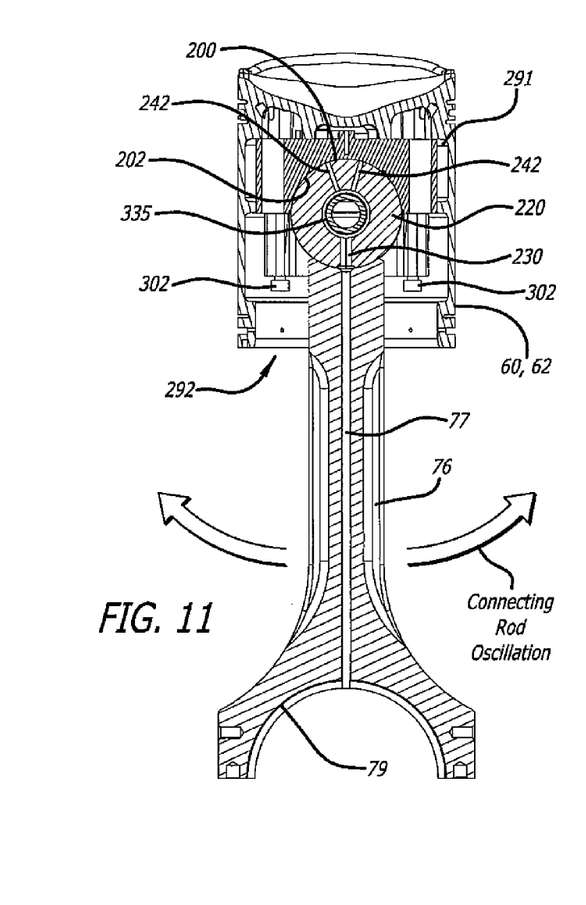

A rocking journal construction capable of providing pressurized oil to lubricate rocking journal bearings that undergo nonreversing loading in the wristpins 74 of the opposed-piston engine of FIG. 2 includes an accumulator that is integrated into the rocking journals. With reference to FIGS. 2 and 9 each of the pistons 60 and 62 is coupled to a connecting rod 76 by a wristpin 74 constituted of a rocking journal bearing 290. In some instances, the rocking journal bearing 290 is constructed with the bearing sleeve 200 and the rocking journal 220 of FIGS. 4 and 6. As per FIGS. 9 and 10, a bearing support structure is mounted to the piston 60, 62. In some instances, the bearing support structure includes separate pieces 291a and 291b. The bearing sleeve 200 is formed in the bearing support structure piece 291a. The bearing sleeve 200 includes a bearing surface with central and lateral surface segments according to FIGS. 4 and 5. The rocking journal 220 is mounted to the small end of the connecting rod 76; preferably, the rocking journal includes central and lateral surface segments according to FIGS. 6 and 7. As shown, for example, in FIGS. 9 and 10, the rocking journal 220 is secured to the connecting rod with threaded fasteners 300. In some instances, the bearing support structure pieces 291a and 291b are joined around the rocking journal 220 and secured to the interior of the piston 60, 62 by fasteners 302 threadably seated in interior structures of the piston. As seen in FIGS. 9 and 10, an opening 292 in the bearing structure support piece 291b receives the connecting rod 76. With reference to FIGS. 10 and 11, when assembled, the bearing support structure 291 retains the rocking journal 220 for rocking oscillation on the bearing surface 202 caused by arcuate oscillation of the connecting rod 76 in the opening 292.

An oil accumulator in the rocking journal includes at least one inlet and a plurality of outlets acting through the journal segments. An exemplary accumulator construction can be understood with reference to FIGS. 9, 10, and 11. A cylindrical shaft 320 is received in the cylindrical inner surface 228 of the rocking journal 220. A flange 322 is fixed to one end of the shaft 320; the opposite end of the shaft receives another flange 324. Retaining rings 326 act between circumferential grooves in the outer surface of the shaft 320 and grooves in the shoulders formed by the stepped diameters in the ends of the rocking journal to retain the shaft 320 in coaxial alignment with the cylindrical inner surface 228 of the rocking journal 220. As the views in FIG. 10 and FIG. 11 show, the smaller diameter of the shaft 320 results in the formation of an annular space 335 between itself and the inner surface 228. FIG. 10 shows that the annular space 335 is in fluid communication with the first outlet passages 240; as illustrated by FIG. 11, the space 335 is also in fluid communication with as many second outlet passages 242 as may be provided in the segments of the rocking journal 220. FIG. 10 and FIG. 11 show that the annular space 335 is in fluid communication with the inlet passage 230 and that the inlet passage 230 is in fluid communication with the high-pressure oil passage 77 drilled in the connecting rod 76. Oil flows into the high-pressure oil passage 77 from one or more circumferential grooves 79 in the big end of the connecting rod 76.

As per FIG. 10 and FIG. 11 lubricating oil flows under pressure from a high pressure source, such as the oil supply for the crankshaft, into the high-pressure oil passage 77. The pressurized oil flowing in the passageway 77 is provided to the rocking journal 220 via the inlet passage 230. The pressurized oil flowing through the inlet passage 230 is received in the accumulator space 335. Pressurized oil received in the space 335 is provided in multiple streams through the first (and second, if any) outlet passages to rocking journal bearing interfaces in the manner described above.

Figure 12:
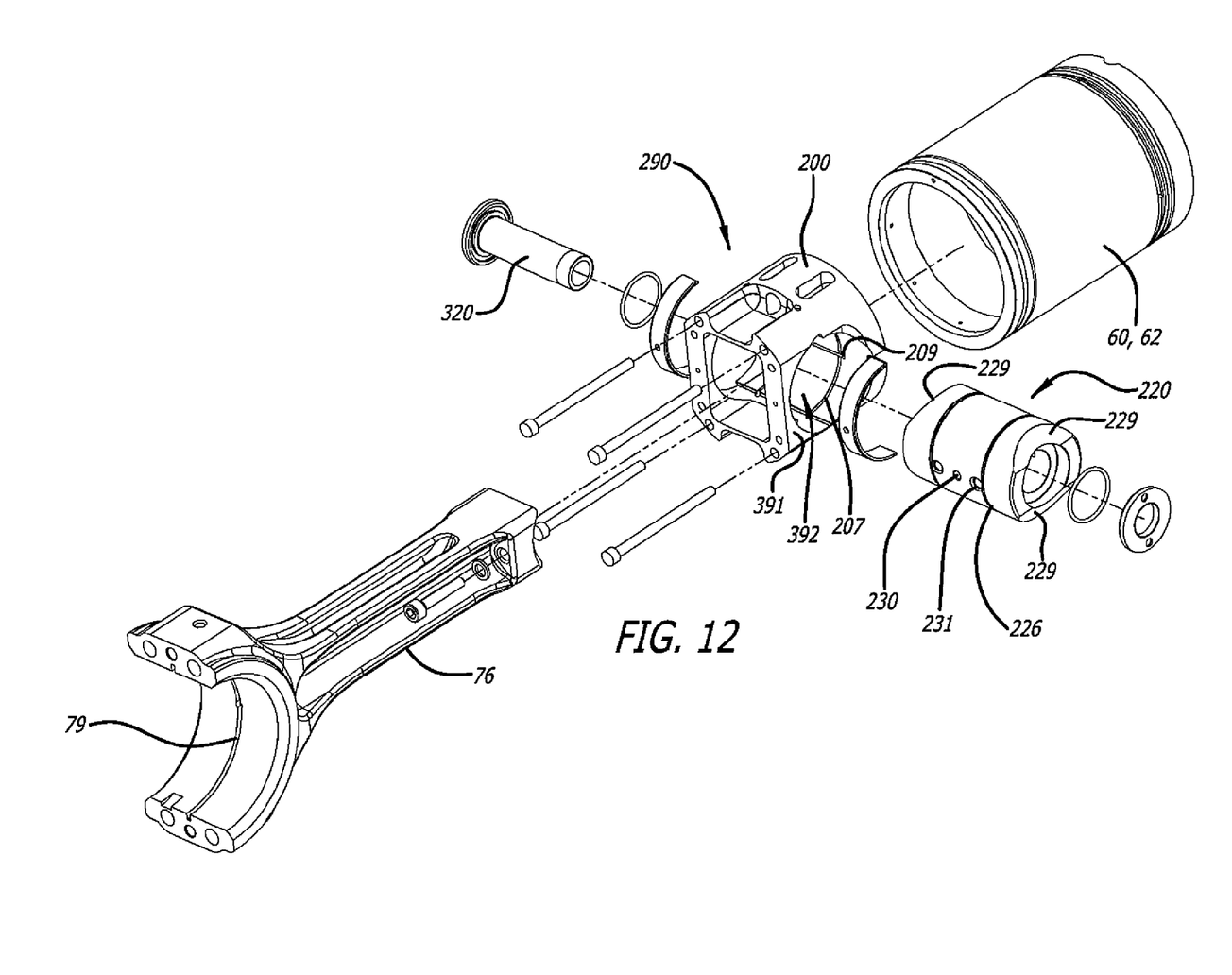
FIG. 12 is an exploded perspective view of an alternative piston linkage assembly including a rocking journal bearing arrangement with the bearing surface and journal elements of FIGS. 4 and 6.
Figure 13:
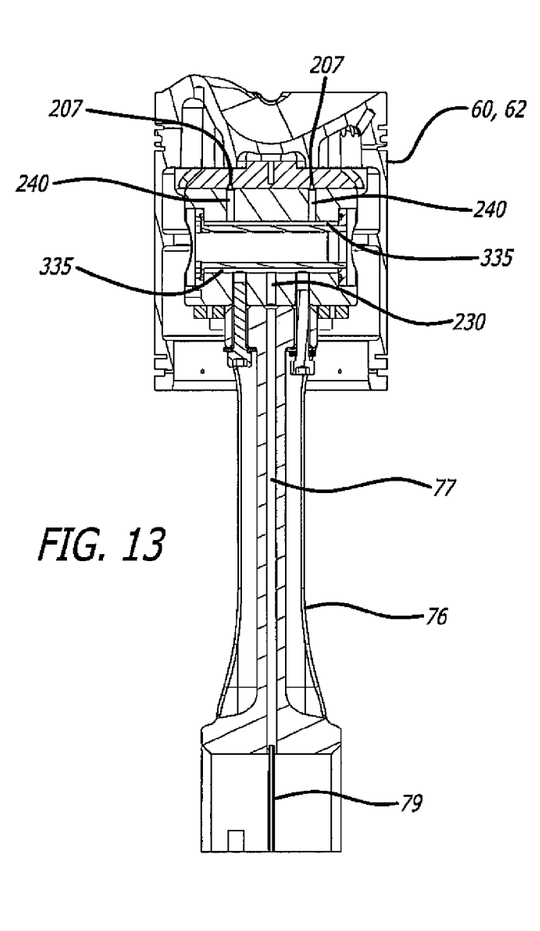
FIGS. 13 and 14 show the assembled piston linkage assembly of FIG. 12 in axially rotated vertical cross-sectional views.
Figure 14:
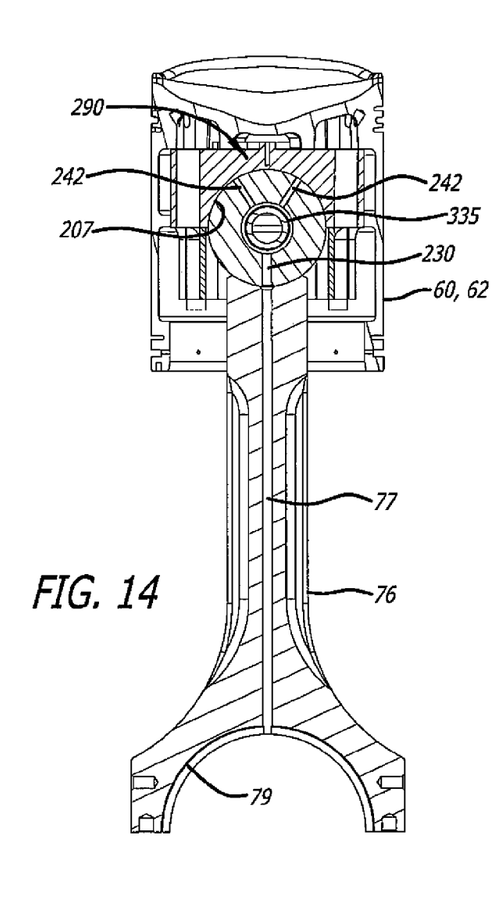

FIGS. 12, 13, and 14 show a rocking journal bearing with an accumulator that is constructed, and operates, as described in connection with FIGS. 9, 10, and 11. However, in this instance, the rocking journal bearing 290 is constructed with a bearing support structure 391 mounted to the piston 60, 62. As is evident from these drawings the bearing support structure 391 includes a unitary piece with an aperture 392 through which the rocking journal is received.

Figure 15:
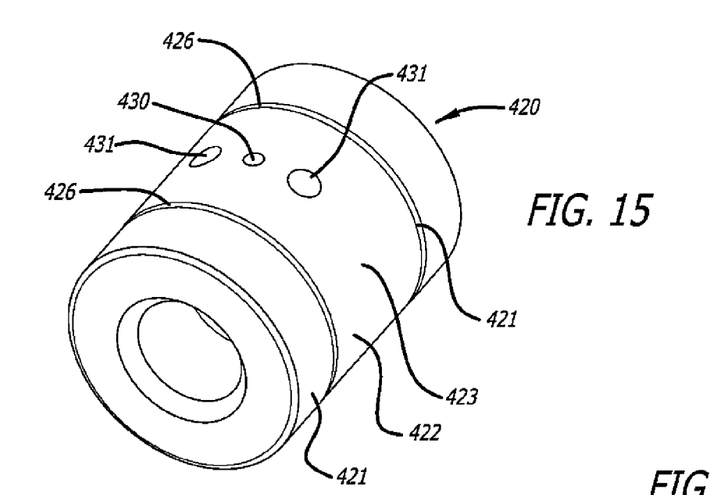
FIGS. 15 and 16 are perspective and longitudinal views, respectively, of a rocking journal element of a second rocking journal bearing construction.
Figure 18:
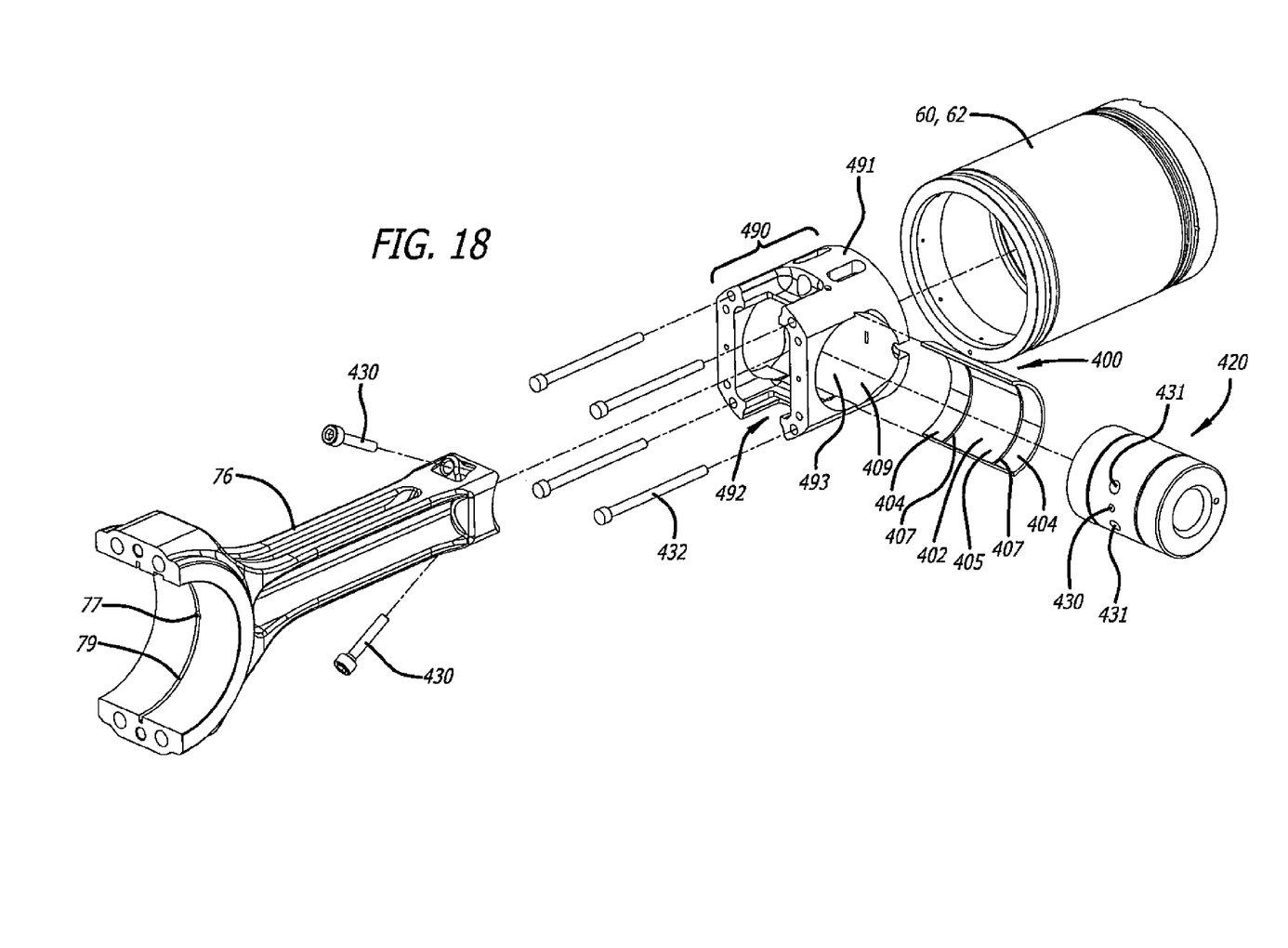
FIG. 18 is an exploded perspective view of an piston linkage assembly including a rocking journal bearing arrangement with the bearing journal element of FIGS. 15, 16, and 17.

With reference to FIGS. 15 and 18 another rocking journal bearing embodiment includes a bearing sleeve element 400 including a bearing surface 402 with a plurality of axially-spaced, eccentrically-disposed surface segments and a rocking journal 420 including a plurality of axially-spaced, eccentrically-disposed journal segments. Preferably, the bearing surface 402 has a semi-cylindrical configuration with two lateral surface segments 404 sharing a first centerline and a central surface segment 405 separating the two lateral surface segments 404 and having a second centerline offset from the first centerline. As per FIG. 18 circumferential oiling grooves 407 are formed in the bearing surface at the borders between the central surface segment 405 and the lateral surface segments 404. In some instances, one or more circumferentially-spaced axial oiling grooves can be formed in the bearing surface 402 as described in connection with FIGS. 4 and 5. In some other instances, oiling grooves can be formed along opposing peripheries of the bearing surface 402 as described in connection with FIGS. 4 and 5. In still other instances, a matrix of oiling grooves can be formed in the bearing surface 402 as described in connection with FIGS. 4 and 5.

Figures 16, 17:
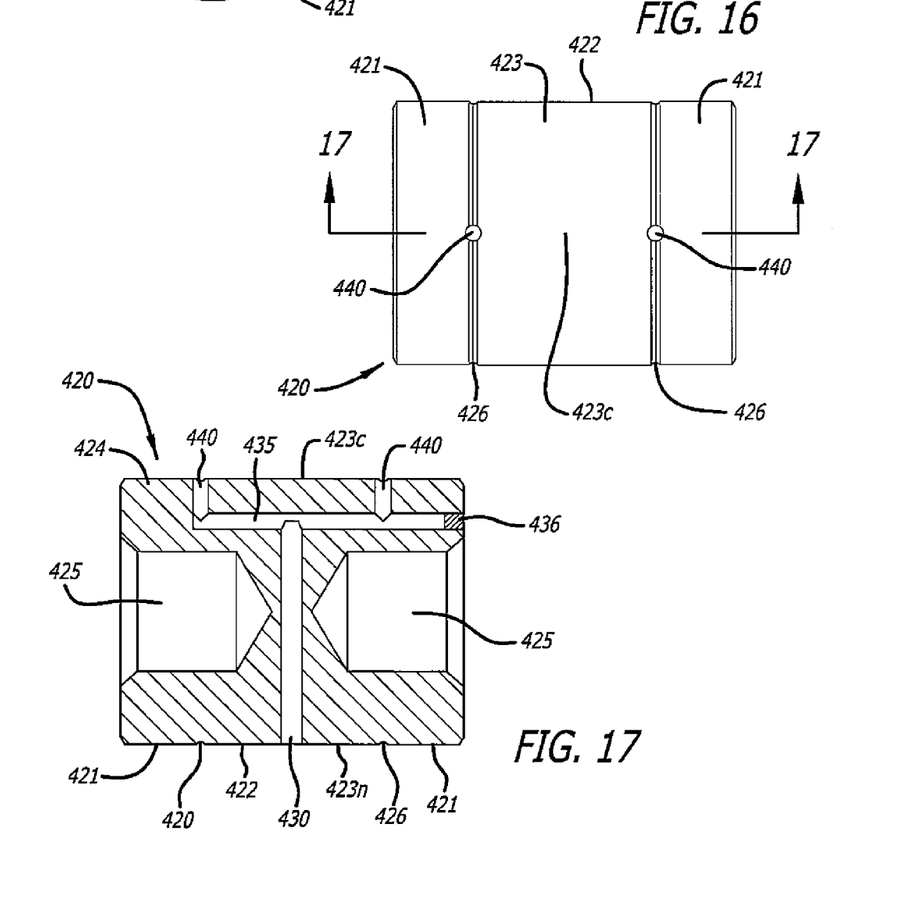
FIG. 17 is an axial cross-section of the rocking journal element of FIGS. 16 and 17.

With reference to FIGS. 15, 16, and 17, the rocking journal 420 has a cylindrical configuration with a two lateral journal segments 421 positioned to share the first centerline and a central journal segment 422 separating the two lateral journal segments and positioned to share the second centerline. The rocking journal 420 is a cylindrical piece with an outer surface 423, a sidewall 424 with a thickness, and a bored-out space 425 at each end. Circumferential oiling grooves 426 formed in the outer surface 423 at the borders between the central journal segment 422 and the lateral journal segments 421. FIGS. 15 and 17 show a non-contacting portion 423n of the outer surface 423 that is out of contact with the bearing surface 402 during oscillation of the bearing. An inlet passage 430 for pressurized oil is formed through the sidewall 424 in a radial direction of the central journal segment 422; the inlet passage 430 opens through the non-contacting outer surface portion 423n. Threaded retaining holes 431 are formed through the non-contacting portion 423n of the surface 423 on a diameter of the central segment shared with the oil inlet passage 430. FIGS. 16 and 17 show a contacting portion 423c of the rocking journal outer surface 423 that is in contact with the bearing surface 402 during oscillation of the bearing. Outlet passages 440 for pressurized oil formed in the contacting surface portion 423c of the journal 420 extend through the sidewall 424 in the circumferential grooves 426 in a radial direction of the central journal segment 422. As best seen in FIG. 17, the oil inlet and outlet passages 430 and 440 are axially spaced, in diametrical opposition. In some aspects, other outlet passages 242 can be formed through the sidewall 224, as described in connection with FIGS. 7 and 8B.

Figure 19:
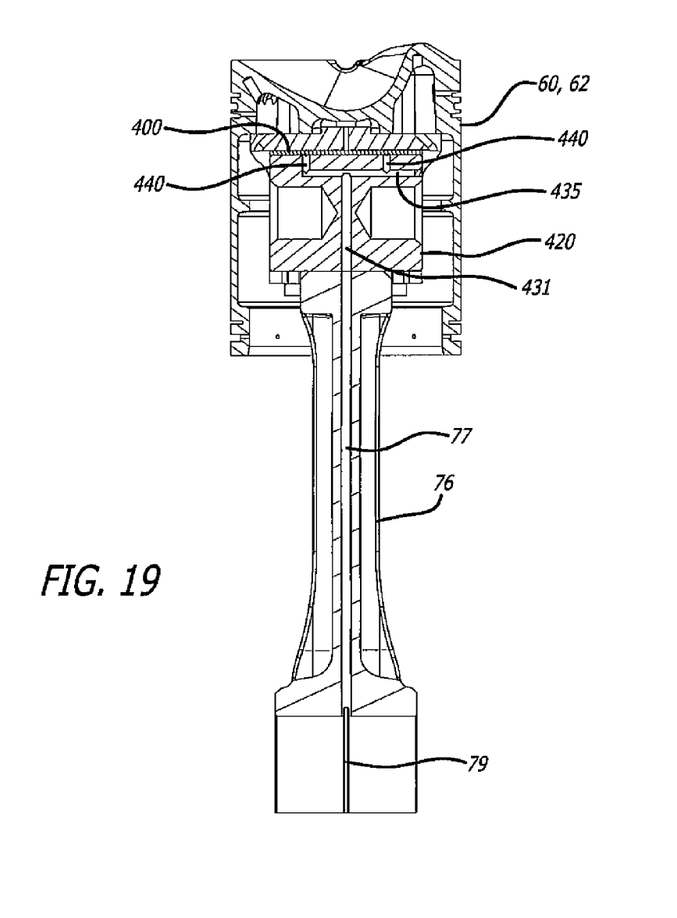
FIGS. 19 and 20 show the assembled piston linkage assembly of FIG. 18 in axially rotated vertical cross-sectional views.
Figure 20:
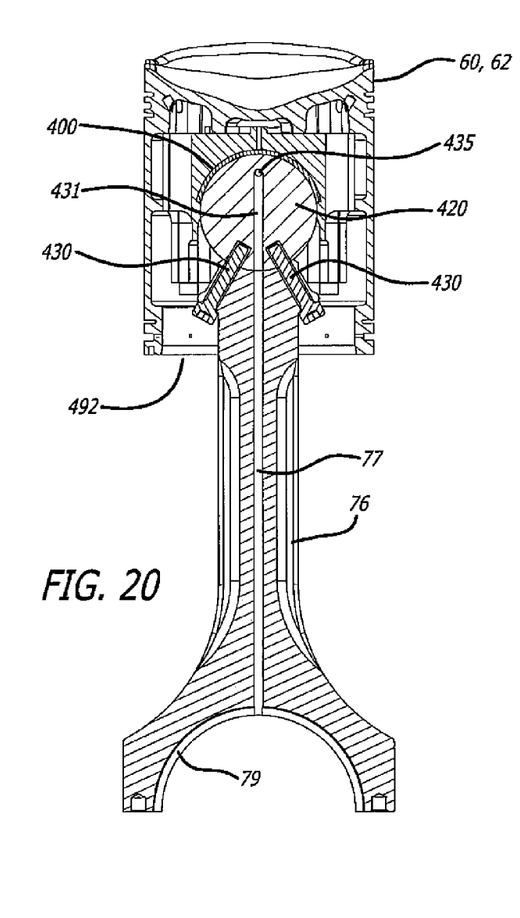

With reference to FIG. 18 each of the pistons 60 and 62 is coupled to a connecting rod 76 by a wristpin constituted of a rocking journal bearing 490. In some instances, the rocking journal bearing 490 is constructed with the bearing sleeve 400 and the rocking journal 420. As per FIGS. 18 and 19, a unitary bearing support structure 491 is mounted to the piston 60, 62. The bearing sleeve 400 is formed as a thin shell inserted into a retaining slot 409 which is broached into the bearing support structure 491. The rocking journal 420 is mounted to the small end of the connecting rod 76. As shown, for example, in FIGS. 18 and 20, the rocking journal 420 is secured to the connecting rod with threaded set screws 430. Alternatively, the rocking journal 420 can be formed on the connecting rod small end during manufacture of the connecting rod 76. In some instances, the bearing support structure 491 is secured to the interior of the piston 60, 62 by set screws 432 threadably seated in interior structures of the piston. As seen in FIGS. 18 and 19, an opening 492 in the bearing support structure 491 receives the connecting rod 76. As seen in FIG. 18, the structure 491 has an aperture 493 to receive the rocking journal 420 after the bearing sleeve 400 is seated in the retaining slot 409. With reference to FIGS. 19 and 20, when assembled, the bearing support structure 491 retains the rocking journal 420 for rocking oscillation on the bearing surface 402 caused by arcuate oscillation of the connecting rod 76 in the opening 492

An oil accumulator in the rocking journal of FIGS. 15, 16, and 17 includes an elongate space, gallery or passage 435 drilled longitudinally through a portion of the sidewall 424 that abuts the contacting surface portion 423c. The passage 435 is plugged at 436. FIG. 17 shows that the elongate passage 435 is in fluid communication with the outlet passages 440 in the circumferential grooves 426; the passage 435 can be constructed to be in fluid communication with any additional outlet passages as may be provided in the segments of the rocking journal 220. FIG. 17 shows that the passage 435 is in fluid communication with the inlet passage 430, and FIGS. 17 and 19 show that the inlet passage 230 is in fluid communication with the high-pressure oil passage 77 drilled in the connecting rod 76. Oil flows into the high-pressure oil passage 77 from one or more circumferential grooves 79 in the big end of the connecting rod 76.

As per FIG. 19 and FIG. 20 lubricating oil flows under pressure from a high pressure source, such as a crankshaft, into the high-pressure oil passage 77. The pressurized oil flowing in the passageway 77 is provided to the rocking journal 420 via the inlet passage 430. The pressurized oil flowing through the inlet passage 430 is received in the passage 435. Pressurized oil received in the passage 435 is provided in multiple streams through outlet passages to rocking journal bearing interfaces in the manner described above.

DESIGN CONSIDERATIONS AND INDUSTRIAL APPLICATIONS

Some aspects of rocking bearing journal construction can be appreciated with reference to the figures. In this regard, when the rocking journal bearing is assembled, the journal 220, 420 is retained for rotation against the bearing sleeve 200, 400 such that the contacting portion 223c, 423c of the journal surface 223, 423 oscillates while in contact with the bearing surface 202, 402. Presuming that the journal 220, 420 has a nominal centerline, the two outer segments 221, 421 of the journal are coaxial with each other and displaced from the centerline of the journal. The central segment 222, 422 of the bearing is displaced in the opposite direction from the journal centerline. The displacement of the two segment centerlines (which correspond to C1 and C2 in FIG. 1) may or may not be equal, depending on the oscillating motion of the connecting rod 76. Thus the two bearing centerlines are eccentric in relation to each other. In application for bearings of 50 to 100 mm in diameter this eccentricity can be on the order of 0.1 to 1 mm. The eccentricity of the bearing provides the mechanical lifting of the journal 220, 420 off of the bearing surface 202, 402 on alternate sides as the connecting rod 76 oscillates from side to side, as indicated in FIG. 11. Fixing the journal 220, 420 to the small end of the connecting rod 76 provides the separation that allows pressurized oil, fed from the accumulator space 335, 435 in the journal 220, 420 via oiling grooves in one or more bearing surfaces, to enter into the void between the bearing surfaces. In some aspects, the rocking journal bearings shown in FIGS. 11, 14, and 20 are designed such that at TC for a brief moment the central and two outer segments are in full contact with the segmented bearing surface. As the crankshaft position changes the outer segments of the journal start opening, (moving away from contact with the outer segments of the surface). At 90+ degrees crank position the outer journal segments start closing, (moving towards the outer bearing surface segments) and central journal segment is loaded. When the crank reaches 180 degrees (BC), for a brief moment, all bearing surfaces are in full contact, but lightly loaded. At 180+ degrees the central journal segment starts opening until 270 degrees when it is fully open and the outer journal segments are loaded. At 360 degrees (TC) all bearing surfaces are momentarily in full contact but heavily loaded and the cycle repeats.

As seen in the figures, the connecting rod is solidly bolted to the rocking journal, which oscillates in a bearing support structure. The bearing surface itself can be of two types: a parent metal material, as shown in FIGS. 4 and 5, or a thin shell bi- or tri-metal bearing as shown in FIG. 18. The thin shell offers the advantages of a replaceable bearing, whose surface can be tailored to the operating needs of the bearing. Additionally abradable coatings can be used on the outer surface of the bearing to allow for loosening of tolerances in the bearing design, as the bearing will "wear itself in" to the design condition during the engine break in period.

The number and placement of oiling grooves and outlet passages in the bearing surface and rocking journal elements of a rocking journal bearing employed in the piston/crankshaft linkage of a two-stroke cycle engine are not intended to be limited by the embodiments described and illustrated herein. Any groove/passage design should consider both how completely the bearing interfaces are covered with an oil film, as well as how adequately the oil film handles loading. Relatedly, a tradeoff is made between film density ratio (FDR), a ratio indicative of the propensity of the film to cavitate, and minimum oil film thickness (MOFT). In this regard, an outlet passage or oiling groove placed to provide oil in the primary load carrying region of the bearing assembly will ensure the integrity of the oil film but decrease the load carrying capacity of the bearing due to imposing the supply pressure as a boundary condition.

Operational parameters should be considered during any analysis of the number and placement of oiling grooves and outlet passages. What may be a suitable configuration for one duty cycle may be problematic at other duty cycles. A relatively low engine speed may allow for fewer holes and grooves or different placement of either in order to place an emphasis on MOFT over filling while conversely higher speed operation may require more holes and grooves at different locations to emphasize filling over MOFT. The end result is that holes and grooves may be placed anywhere on the journal and/or sleeve surfaces depending on the application.

In some aspects, it may be desirable to provide opposing chamfers in the surfaces of the end portions of the outer journal segments. An example in this regard is shown in FIG. 12, where at least one chamfer 229 is formed in the surface of an end portion of each outer journal segment, positioned between contacting and non-contacting surface portions of the rocking journal 220. Preferably, opposing chamfers are formed in the surface of the end portion of each outer journal segment 221. Advantageously, the chamfered ends provide better conformance with the cylindrical construction of the support structure 391 and enable greater surface contact between the rocking journal and sleeve than the unchamfered rocking journals seen in FIGS. 9 and 18.

The piston components can be made of 4140 alloy steel; the connecting rods can be made of 4140 or 4340 alloy steel; preferably, the bearing components can be made of 8620 alloy steel.

Thus, although rocking journal bearing arrangements with oil accumulators, galleries, and other oil-receiving spaces in the rocking journal have been described with reference to preferred embodiments, it should be understood that various modifications can be made without departing from the principles set forth in the specification and drawings. Accordingly the scope of invention embodied in these principles is limited only by the following claims.

The invention claimed is:

1. A rocking journal bearing for a two-stroke cycle engine, comprising:
    a bearing support structure;
    a bearing sleeve in the bearing support structure, the bearing sleeve including a bearing surface with a plurality of axially-spaced, eccentrically-disposed surface segments;
    a matrix of oiling grooves in the bearing surface, the matrix including circumferential and axial oiling grooves in which circumferential oiling grooves are disposed between adjacent surface segments and axial oiling grooves intersect circumferential oiling grooves;
    a rocking journal including a plurality of axially-spaced, eccentrically-disposed journal segments;
    the bearing support structure retaining the rocking journal for rocking oscillation on the bearing surface; and,
    an oil-receiving space in the rocking journal with oil outlet passages acting through the journal segments;
    wherein the rocking journal includes at least two axially-spaced circumferential oiling grooves in a journal outer surface, between journal segments, and at least one oil outlet passage opens through each of the circumferential oiling grooves in the journal outer surface.

2. The rocking journal bearing of claim 1, in which at least two circumferentially-spaced axial oiling grooves run across a central surface segment, at least partially into two lateral surface segments separated by the central surface segment.

3. The rocking journal bearing of claim 2, in which the bearing support structure includes separate pieces joined around the rocking journal.

4. The rocking journal bearing of claim 2, in which the bearing support structure includes a unitary piece and an aperture through which the rocking journal is received.

5. The rocking journal bearing of claim 2, wherein the oil-receiving space includes one of an annular space and a gallery in the rocking journal.

6. The rocking journal bearing of claim 2, wherein the rocking journal includes opposing ends and each end includes opposing chamfers.

7. An opposed-piston engine including at least one cylinder with longitudinally-separated exhaust and intake ports, a pair of pistons disposed in opposition to one another in a bore of the cylinder, and a pair of connecting rods, in which each piston is connected to a respective connecting rod by a rocking journal bearing including:
- a bearing support structure mounted to the piston;
- a bearing sleeve in the bearing support structure, the bearing sleeve including a bearing surface with a plurality of axially-spaced, eccentrically-disposed surface segments;
- a matrix of oiling grooves in the bearing surface, the matrix including circumferential and axial oiling grooves in which each circumferential oiling groove is disposed between respective adjacent surface segments and axial oiling grooves intersect circumferential oiling grooves;
- a rocking journal mounted to the connecting rod, the rocking journal including a plurality of axially-spaced, eccentrically-disposed journal segments;
- the bearing support structure retaining the rocking journal for rocking oscillation on the bearing surface; and,
- means for receiving oil in the rocking journal with at least one oil inlet passage and a plurality of oil outlet passages acting through the journal segments;
- wherein the rocking journal includes at least two circumferential oiling grooves in a journal outer surface, each disposed between respective adjacent journal segments, and at least one oil outlet passage opens through each of the circumferential oiling grooves in the journal outer surface; and,
- wherein the means for receiving oil includes one of an annular space and a gallery in the rocking journal.

8. The opposed-piston engine of claim 7, wherein the connecting rod includes an oil passage in communication with the oil inlet passage.

9. The opposed-piston engine of claim 7, in which at least two axial oiling grooves run across a central surface segment, at least partially into two lateral surface segments separated by the central surface segment.

10. The opposed-piston engine of claim 7, in which the bearing support structure includes either separate pieces joined around the rocking journal or a unitary piece with an aperture through which the rocking journal is received.

* * * * *